(12) United States Patent
Pelkey

(10) Patent No.: US 9,782,837 B2
(45) Date of Patent: Oct. 10, 2017

(54) SELF-ADJUSTING POCKET HOLE JIG

(71) Applicant: Michael H. Pelkey, Las Vegas, NV (US)

(72) Inventor: Michael H. Pelkey, Las Vegas, NV (US)

( * ) Notice: Subject to any disclaimer, the term of this patent is extended or adjusted under 35 U.S.C. 154(b) by 0 days.

(21) Appl. No.: 15/283,207

(22) Filed: Sep. 30, 2016

(65) Prior Publication Data

US 2017/0087644 A1 Mar. 30, 2017

Related U.S. Application Data

(60) Provisional application No. 62/234,928, filed on Sep. 30, 2015.

(51) Int. Cl.
*B23B 47/28* (2006.01)
*B23B 49/00* (2006.01)

(52) U.S. Cl.
CPC .......... *B23B 47/287* (2013.01); *B23B 49/003* (2013.01); *B23B 2247/10* (2013.01); *B23B 2260/0482* (2013.01); *Y10T 408/567* (2015.01)

(58) Field of Classification Search
CPC . B23B 2247/10; B23B 2247/18; B23B 47/28; B23B 47/287; Y10T 408/567
See application file for complete search history.

(56) References Cited

U.S. PATENT DOCUMENTS

| | | | | |
|---|---|---|---|---|
| 2,176,608 A | * | 10/1939 | Marsilius | B25B 1/103 269/146 |
| 2,470,038 A | * | 5/1949 | Long | B23B 47/288 408/109 |
| 5,791,835 A | * | 8/1998 | Chiang | B23B 47/287 408/103 |
| 6,481,937 B1 | | 11/2002 | Sommerfeld et al. | |
| 6,659,695 B2 | * | 12/2003 | Park | B23B 47/288 408/103 |
| 6,726,411 B2 | | 4/2004 | Sommerfeld et al. | |

(Continued)

FOREIGN PATENT DOCUMENTS

CN 204108382 1/2015

OTHER PUBLICATIONS

Vladimirova, T., Authorized Officer of ISA/RU, "Notification of Transmittal of the International Search Report and the Written Opinion of the International Searching Authority, or the Declaration", for PCT US2016/055018, 1 page, dated Feb. 9, 2017.

(Continued)

*Primary Examiner* — Daniel Howell
(74) *Attorney, Agent, or Firm* — John C. Lambertsen; Kenehan & Lambertsen, Ltd.

(57) ABSTRACT

A pocket hole jig utilizes a pair of adjustable drill guides attached at the front of a movable carriage to enable self-adjustment in pocket hole placement over a range of workpiece thicknesses. The carriage is slidably received on an angled base member and may be moved toward or away from a vertical base member used to support wooden workpieces. A locking mechanism retains the carriage in its adjusted position. The pair of drill guides are adjustably positioned towards or away from one another and relative to the pocket hole jig axis of symmetry, locating the pair of pocket hole drilling locations.

10 Claims, 17 Drawing Sheets

(56) References Cited

U.S. PATENT DOCUMENTS

| | | | |
|---|---|---|---|
| 7,374,373 B1* | 5/2008 | Park | B23B 39/003 |
| | | | 408/103 |
| 7,641,424 B1* | 1/2010 | Sommerfeld | B23B 47/287 |
| | | | 408/103 |
| 7,641,425 B2 | 1/2010 | Sommerfeld et al. | |
| 7,967,534 B2 | 6/2011 | McDaniel et al. | |
| 7,976,252 B2 | 7/2011 | McDaniel et al. | |
| 8,029,214 B2 | 10/2011 | McDaniel et al. | |
| 8,231,313 B2 | 7/2012 | Sommerfeld et al. | |
| 8,840,345 B1* | 9/2014 | Park | B23B 47/287 |
| | | | 408/103 |
| 2008/0099101 A1* | 5/2008 | Chiang | B23B 47/287 |
| | | | 144/2.1 |
| 2011/0150587 A1 | 6/2011 | Stukuls | |
| 2014/0341665 A1* | 11/2014 | Clark | B23Q 11/0042 |
| | | | 408/67 |

OTHER PUBLICATIONS

Naydenova, T., Authorized Officer of ISA/RU, "International Search Report", for PCT US 2016/055018, 2 pages, dated Feb. 9, 2017.

Naydenova, T., Authorized Officer of ISA/RU, "Written Opinion of the International Searching Authority", for International Application No. PCT/US 2016/055018, 3 pages, dated Feb. 9, 2017.

* cited by examiner

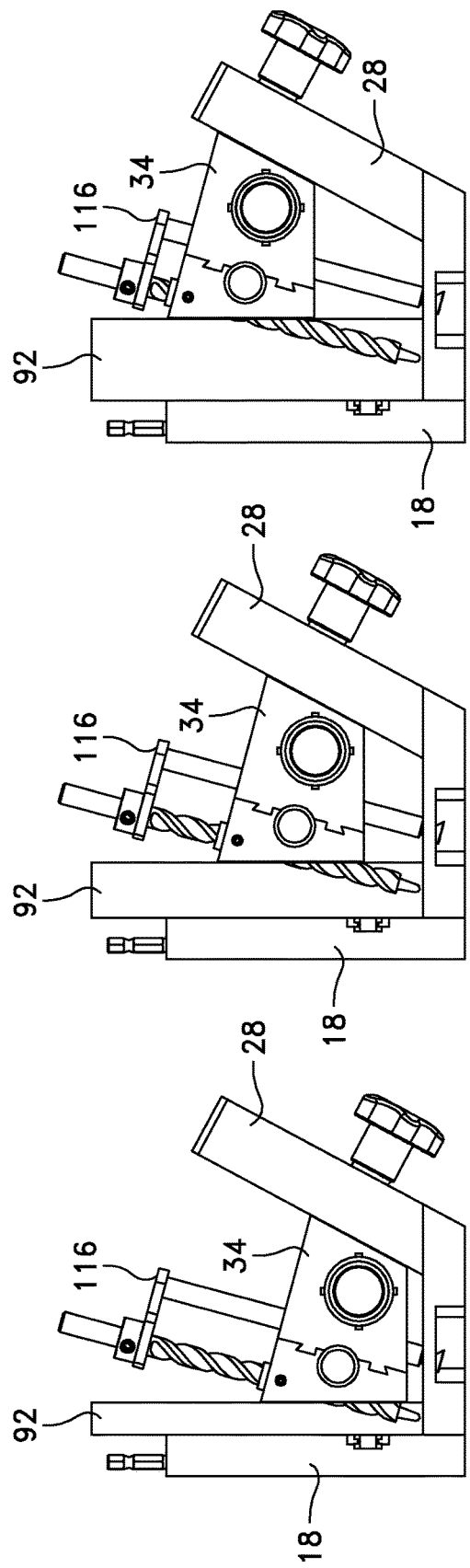

SELF-ADJUSTING POCKET HOLE JIG

RELATED APPLICATIONS

The present application claims the benefit of priority under 35 USC §119(e) to U.S. Provisional Application No. 62/234,928, filed on Sep. 30, 2015, which is incorporated by reference herein for all that it contains.

BACKGROUND OF THE INVENTION

Field of the Invention

The present invention relates to jig used to join two workpieces and, more particularly, to a pocket hole jig. More specifically, the present invention relates to a pocket hole jig that self-adjusts to correctly position a pair of pocket holes, symmetrically located about the centerline of the jig, over the clamp range of wood workpiece thicknesses.

Description of the Related Art

Pocket hole joinery is used extensively in woodworking as a quick and easy way to join two wood workpieces. A pocket hole is a pilot hole drilled at an angle in a first wood workpiece to align a screw for fastening to a second workpiece. A step drill creates a counterbored hole for the head of the pocket screw and a smaller diameter for body clearance in the last half-inch or so. This manner of joint attachment is visually clean—as the pocket holes and pocket hole screw heads hide in the internal, underside construction areas of woodworking projects.

Initially, pocket hole joinery required chisel work followed by a brace and bit. A present-day user now uses a jig with an electric hand drill, easily and quickly making the joint. Several jigs are commercially available, albeit costly, complex, and bulky. Often complicated to use, some having a poor design generate holes with ragged edges.

SUMMARY OF THE INVENTION

The present invention provides a pocket hole jig having a one-piece base, a sliding carriage with a simple clamping mechanism, an accurate drill stop assembly, two symmetrically adjustable drill guides, an adjustable side stop mechanism, and a sealed dust port chamber. The jig of the present invention self-adjusts to the thickness of the wood, accurately creating the pocket hole at the correct position for any wood thickness appropriate for use within the clamp holding the two workpieces. Once initially set, the step drill stop collar requires no further adjustments within the clamp range of workpiece widths. Screw selection is likewise simplified, requiring thickness measurement of the second workpiece, to which is added ½ inch for total screw length.

An aspect of embodiments in accordance with the present invention is a self-adjusting pocket hole jig comprising: a jig base comprising: a vertical base member, a horizontal base member attached to said vertical base member, and an angled base member attached to said horizontal member, and wherein in its assembled operable condition there is no movement among the individual base members of said jig base; a carriage slidably mounted to said angled base member and in its assembled operable condition adapted for movement toward and away from said vertical base member of said jig base; a pair of adjustable drill guides, each slidably mounted to a front surface of said carriage in a side-to-side reciprocating manner and in its assembled operable condition adapted for movement toward and away from one another, and wherein each of said adjustable drill guides has a drill guide bore formed therein, said drill guide bore extending from an upper surface to a front surface thereof; and a depth stop plate attached to said jig base and extending over each of said adjustable drill guides in a vertically superposed manner, wherein said depth stop plate has a pair of apertures formed therein, each of said pair of apertures located over a separate one of said pair of adjustable drill guides and each vertically co-located over a separate one of the drill guide bores.

These and other objects, aspects, and features of the present invention will be better understood from the following description of embodiments when read in conjunction with the appended drawing figures.

BRIEF DESCRIPTION OF THE DRAWINGS

Embodiments in accordance with the present invention are described below in connection with the accompanying drawing sheets.

FIG. 9 is a schematic representation in side elevation of the self-adjusting pocket hole jig with a clamped workpiece of narrow thickness in accordance with the present invention.

FIG. 10 is a schematic representation in side elevation, similar to FIG. 9, of the self-adjusting pocket hole jig with a clamped workpiece of medium thickness in accordance with the present invention.

FIG. 11 is a schematic representation in side elevation, similar to FIGS. 9 and 10, of the self-adjusting pocket hole jig with a clamped workpiece of wide thickness in accordance with the present invention.

DETAILED DESCRIPTION OF THE PREFERRED EMBODIMENTS

The self-adjusting pocket hole jig is disclosed herein with respect to exemplary embodiments. The embodiments are disclosed for illustration of the self-adjusting pocket hole jig and a manner of operation, and are not limiting except as defined in the appended claims.

Figure 1:
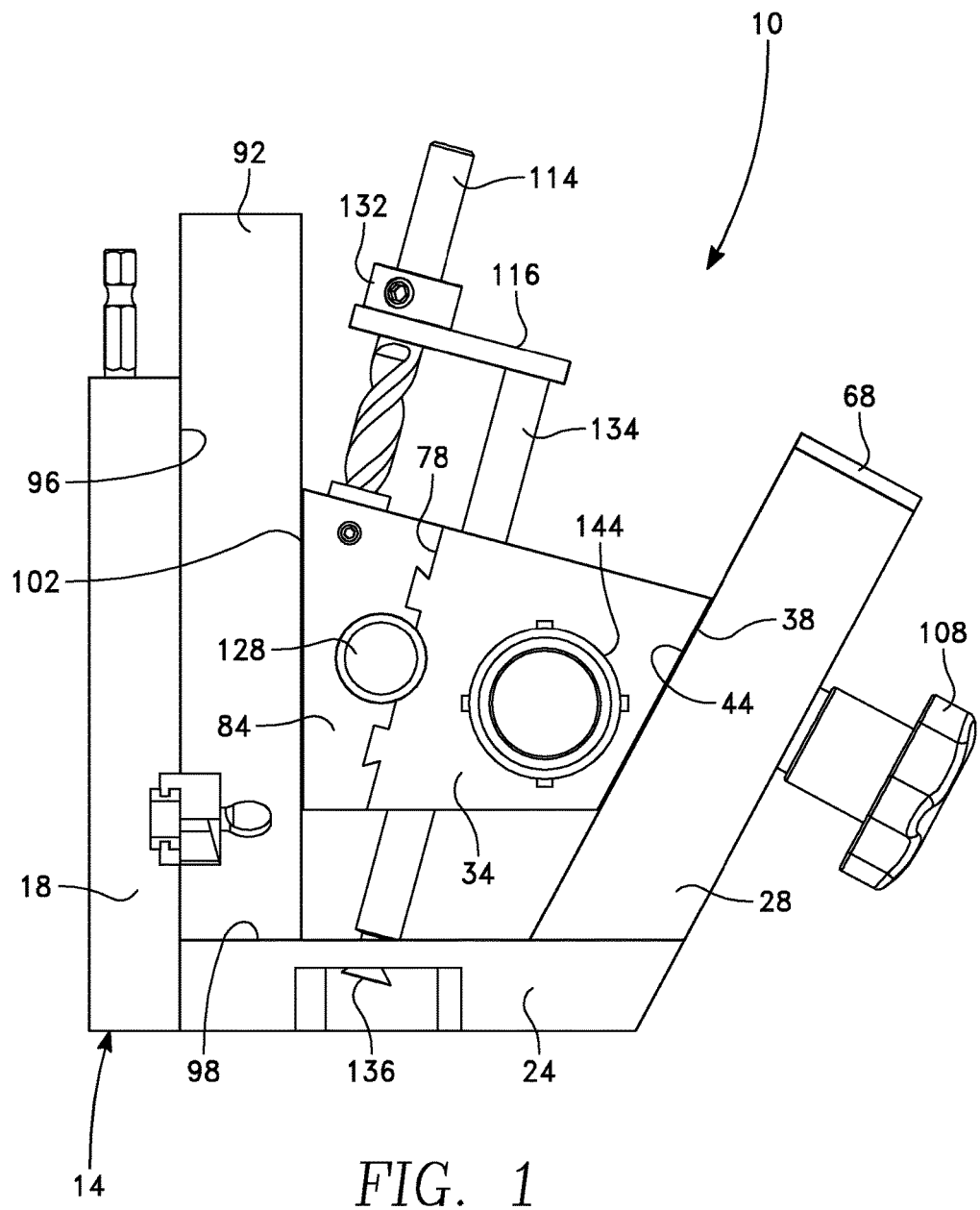
FIG. 1 is a side elevation view of a self-adjusting pocket hole jig in accordance with the present invention.
Figure 2:
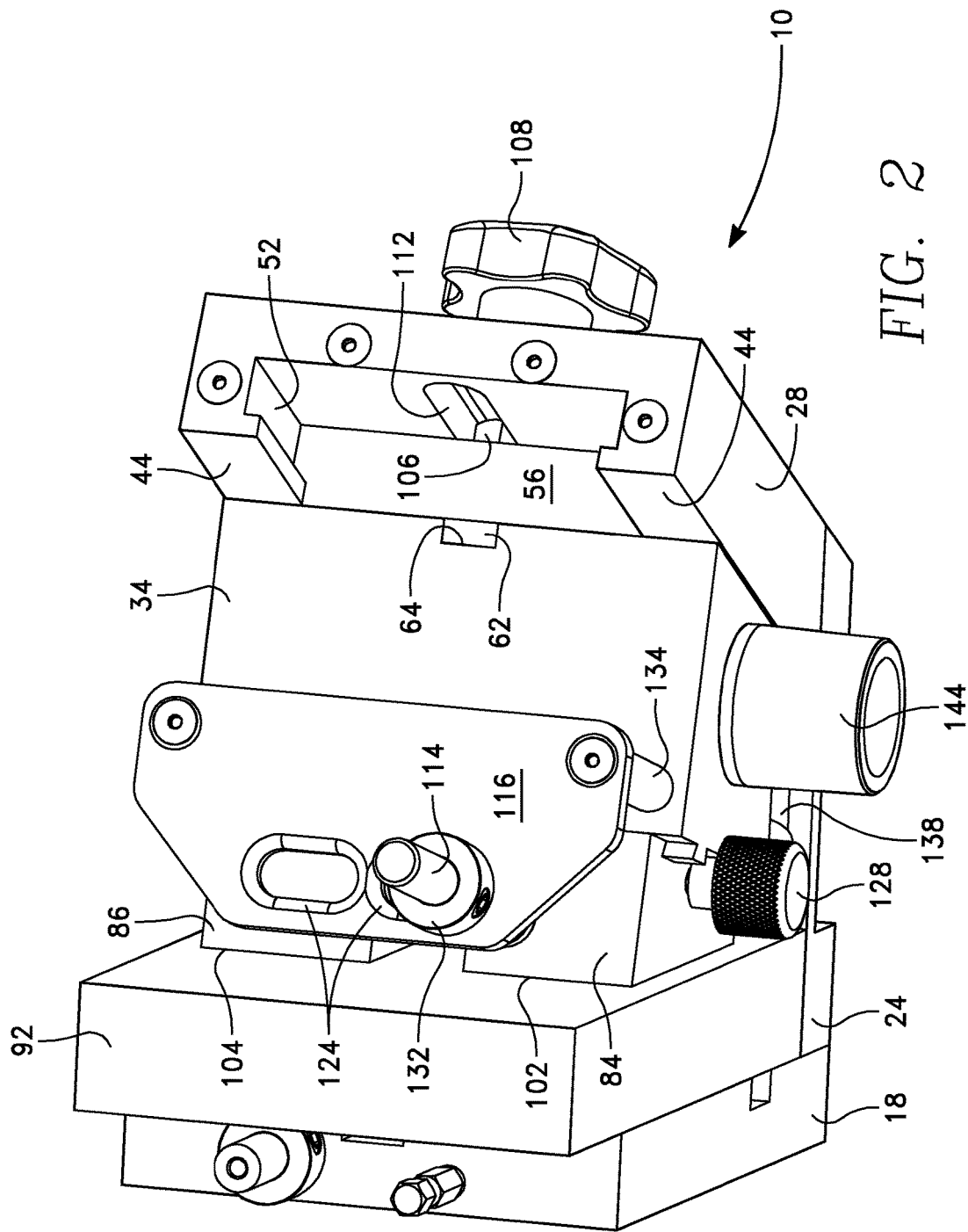
FIG. 2 is a top view in perspective of the self-adjusting pocket hole jig of FIG. 1.
Figure 3:
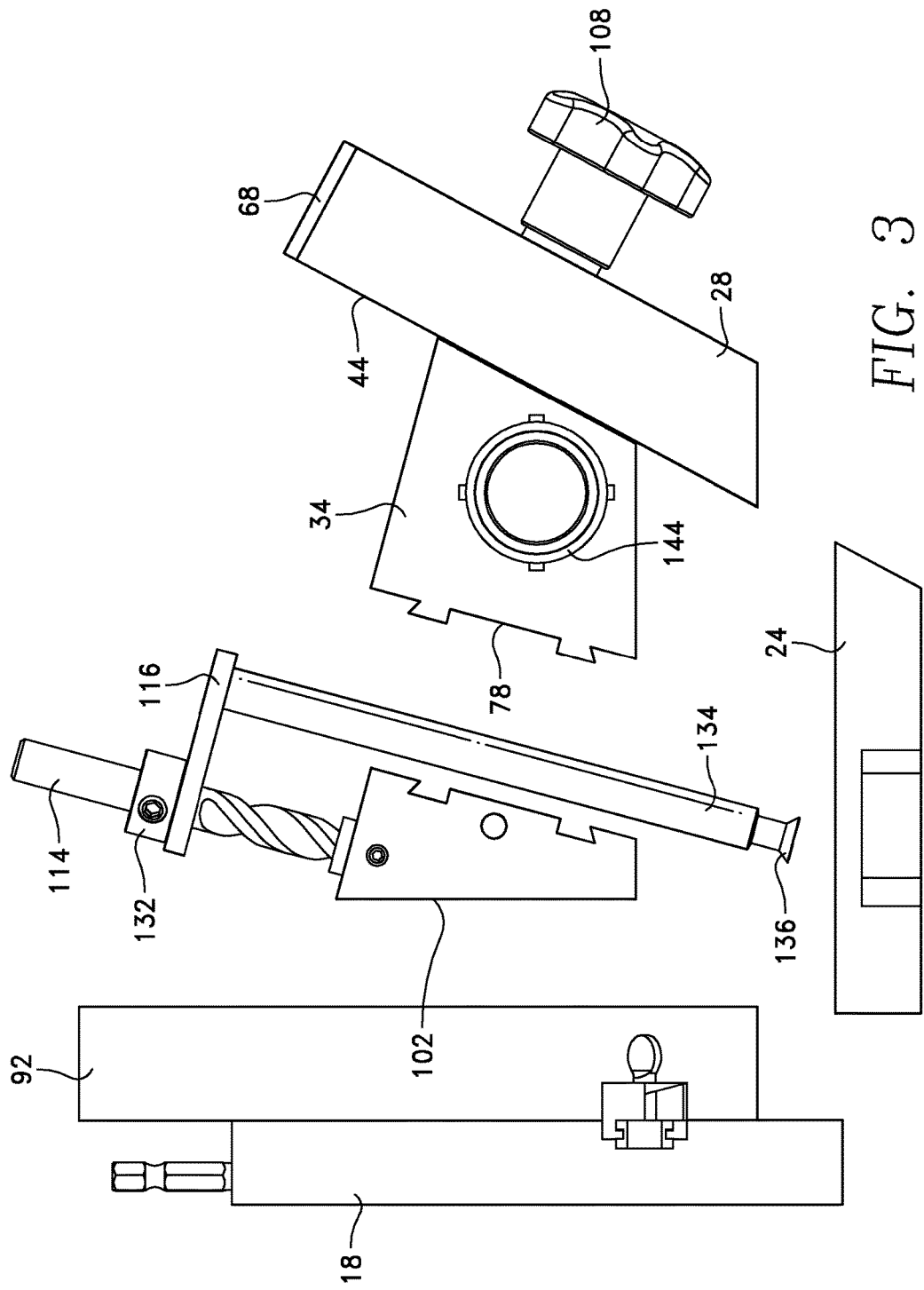
FIG. 3 is an exploded side elevation view of the self-adjusting pocket hole jig of FIG. 1.
Figure 4:
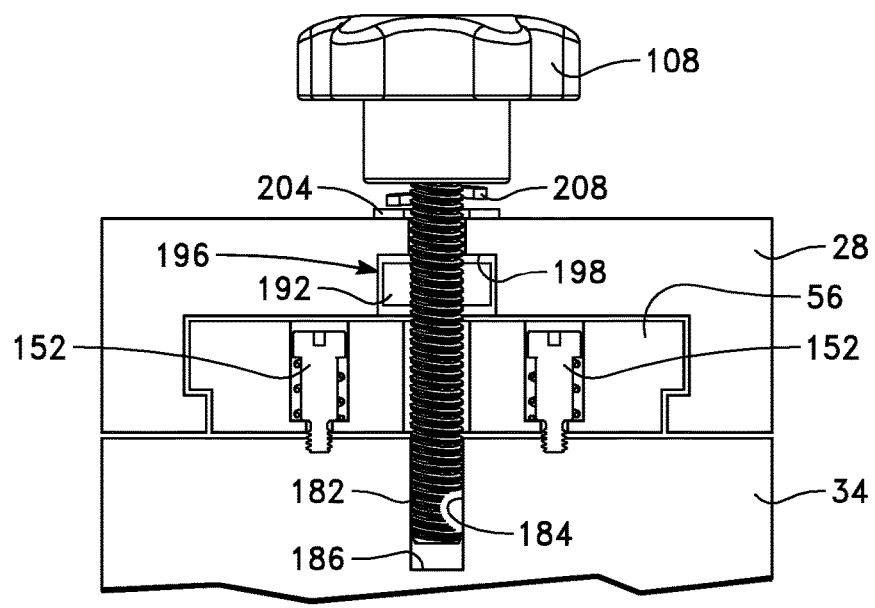
FIG. 4 is a partial cross-sectional view of the carriage locking mechanism in accordance with the present invention.
Figure 5:
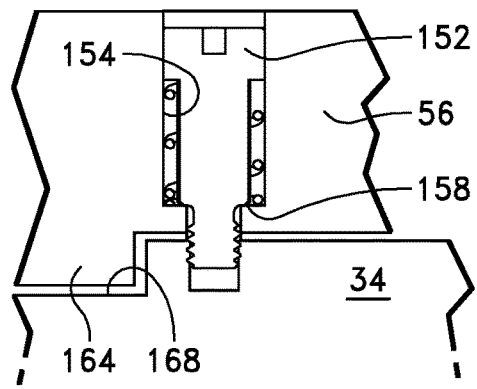
FIG. 5 is an enlarged partial cross-sectional view of the manner of connecting the slide plate and carriage in accordance with the present invention.
Figure 6:
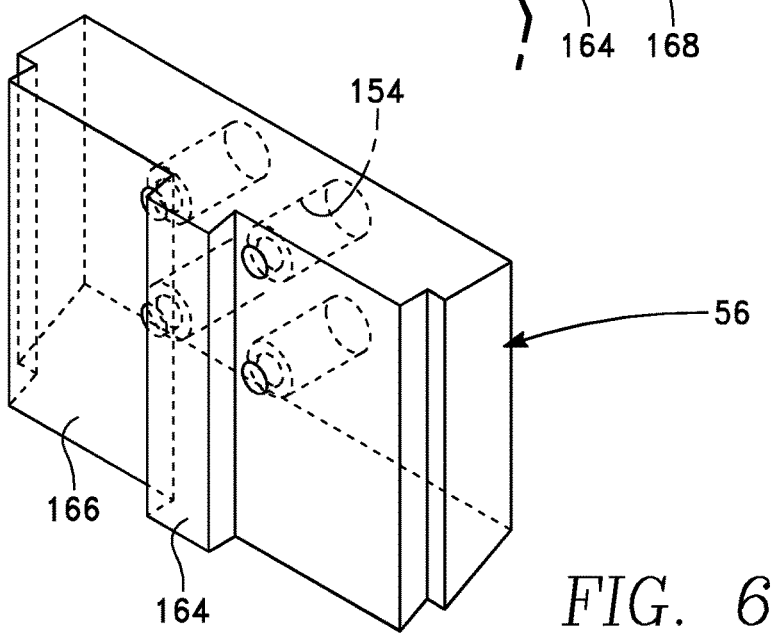
FIG. 6 is a perspective view, with portions shown in phantom, of the slide plate in accordance with the present invention.

A pocket hole jig 10 in accordance with the present invention is shown in FIGS. 1 and 2, and the exploded view of FIG. 3. The pocket hole jig 10 includes a jig base 14 formed of three attached base members, a vertical member 18, a horizontal member 24, and an angled member 28. In a presently preferred embodiment a plurality of cavities for storage are provided within the vertical base 18, (a stored step drill and a stored driver are shown in FIGS. 1-3).

A carriage 34 travels along the angled base 28, a rear surface 38 slidably engaging the inclined front surface 44 of the angled base 28. A slide channel 52 formed in the angled base member (see FIG. 2) slidably receives a slide plate 56, the slide plate 56 having an outer surface of matching configuration to the slide channel 52.

As described in greater detail below, the slide plate 56 is attached to the carriage 34, with a slide alignment boss 62 extending from the slide plate 56 and received within a slide alignment slot 64 formed in the rear surface of the carriage 34. This manner of interconnection assists in maintaining the relative positional alignment between the slide plate 56 and the attached carriage 34. A top stop 68 attached at the top end of the angled base member 28 and overlying the angled base slide channel 52 (shown removed in FIG. 2), secures the slide plate 56 within the slide channel 52.

A front surface 78 of the carriage 34 receives a pair of laterally adjustable drill guides 84, 86. A wooden workpiece 92 is shown clamped between inner surfaces 96, 98 of the vertical and horizontal bases 18, 24, and front surfaces of the pair of drill guides 102, 104.

Adjustments due to variance in the thickness of workpieces are obtained through movement of the carriage 34 along the inclined front surface 44 of the angled base 28. When the front surfaces 102, 104 of the pair of adjustable drill guides 84, 86 contact the outer workpiece surface, a clamping mechanism actuated through a clamping shaft 106 attached to a clamping adjustment knob 108, tightens the carriage/angled base interface, preventing further movement of the carriage 34 or of the workpiece 92 when the carriage 34 is lowered to abut the outer workpiece surface. A vertical slot 112 formed in the angled base 28 enables vertical movement of the clamping shaft 106 and attached clamping adjustment knob 108 when the clamping mechanism is loosened to permit movement of the carriage 34.

As also shown in FIGS. 1-3, a step drill 114 is supported by a depth stop plate 116, which extends forward to a position overlying both pair of drill guides 84, 86. A pair of laterally elongated slots 124 are provided (see FIG. 2), each extending over a separate one of the pair of adjustable drill guides 84, 86. The elongated slots 124 enable placement of the step drill 114 in the drill guide of choice, over the range of lateral positions—as adjusted by a drill guide spacing control knob 128.

A step drill collar 132 has a diameter wider than the width of the elongated slots 124, providing a vertical limit to passage of the step drill 114 into the adjustable drill guides 84, 86. The step drill collar 132 arrests further downward motion of the step drill 114 when the bottom surface of the step drill collar 132 reaches the upper surface of the depth stop plate 116.

A pair of guide rods 134 control horizontal movement of the depth stop plate 116 (only one shown in FIGS. 1 and 2). Bottom cap screws 136 restrict upward vertical movement of the guide rods 134, and downward movement is restricted by a reduction in diameter of the guide rods 134 as they extend through bottom support grooves 138. The pair of guide rods 134 are received within a pair of guide rod apertures 142 formed in and extending vertically through the carriage 34 (see FIG. 19).

Drilling generates wood chips and dust. A network of ducting formed in the drill guides and the carriage body routes this debris away from the step drill. A shop vac connection 144 located on one side of the carriage 34 enables the easy evacuation of the accumulating chips and dust during drill operation.

FIGS. 4-8 show additional details of the clamping mechanism. The slide channel 52 formed within the angled base 28 slidably receives the slide plate 56, which has an outer surface of matching configuration to the slide channel 52. The slide plate 56 is attached to the carriage 34 using preferably four shoulder screws 152 received within four shoulder screw apertures 154 that extend through the slide plate 56 and partially into the carriage 34. A compression spring 156 is received within each aperture and rests against a lower shoulder 158 formed therein. The compression springs 156 permit the limited separation of the carriage 34 from the slide plate 56 while maintaining their attachment.

A centrally located slide alignment boss 164 extends from a rear surface 166 of the slide plate 56 and is received within a slide alignment slot 168 formed in a rear surface 172 of the carriage 34. The slide alignment boss 164 assists in further maintaining relative positional alignment between the slide plate 56 and the attached carriage 34.

A threaded clamping shaft 182 extends through the vertical slot 112 formed in the angled base 28, then through a clamping shaft passage 184 formed within the slide plate 56, terminating within a closed-end aperture 186 formed in the carriage 34. The clamping adjustment knob 108 attaches to the outer end of the threaded clamping shaft 182, enabling the easy grasping and rotation by a user.

A clamping nut 192 is received mid-way along the threaded clamping shaft 182. The inside surface of the slide channel adjacent the vertical slot 112 is recessed along its length to form an extended nut housing recess 196 with a nut securement base surface 198. Upon a tightening rotation of the threaded clamping shaft 182, the clamping nut 192, moving in an outward direction, toward the clamping adjustment knob 108, enters the nut housing recess 196 within the vertical slot 112.

Figure 7:
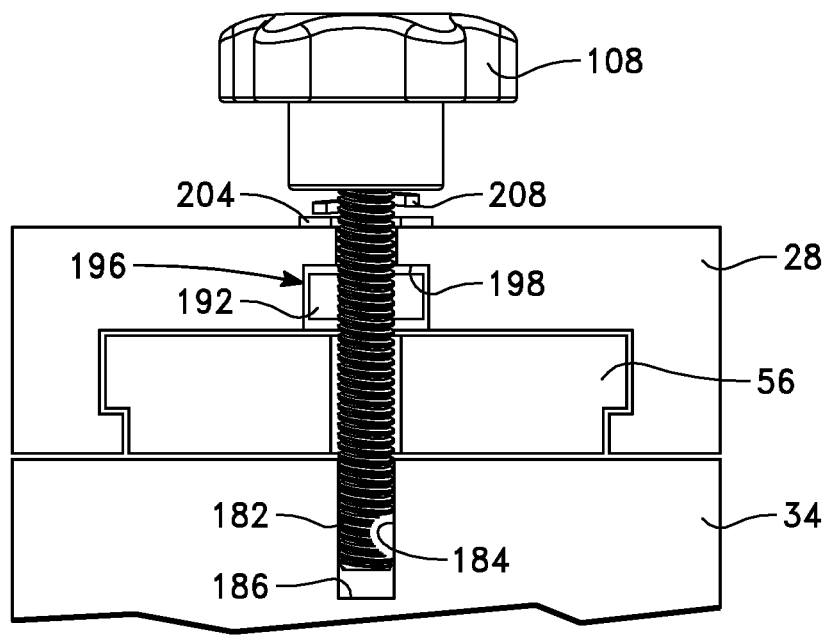
FIG. 7 is schematic representation of the carriage locking mechanism with the slide plate clamped against the angled base member in accordance with the present invention.

Continued tightening of the threaded clamping shaft 182 eventually causes the clamping nut 192 to reach the nut securement base surface 198, preventing further outward movement of the clamping nut 192. As shown by FIG. 7, the clamping mechanism has secured the vertical position of the threaded clamping shaft 182, the slide plate 56, and the attached carriage 34. A flat clamping shaft washer 204 and a split clamping shaft washer 208 are preferably received upon the threaded clamping shaft between the outer surface of the angled base 28 and the clamping adjustment knob 108 to prevent the uncommanded loosening of the clamping adjustment knob 108 while in this vertically locked position.

Figure 8:
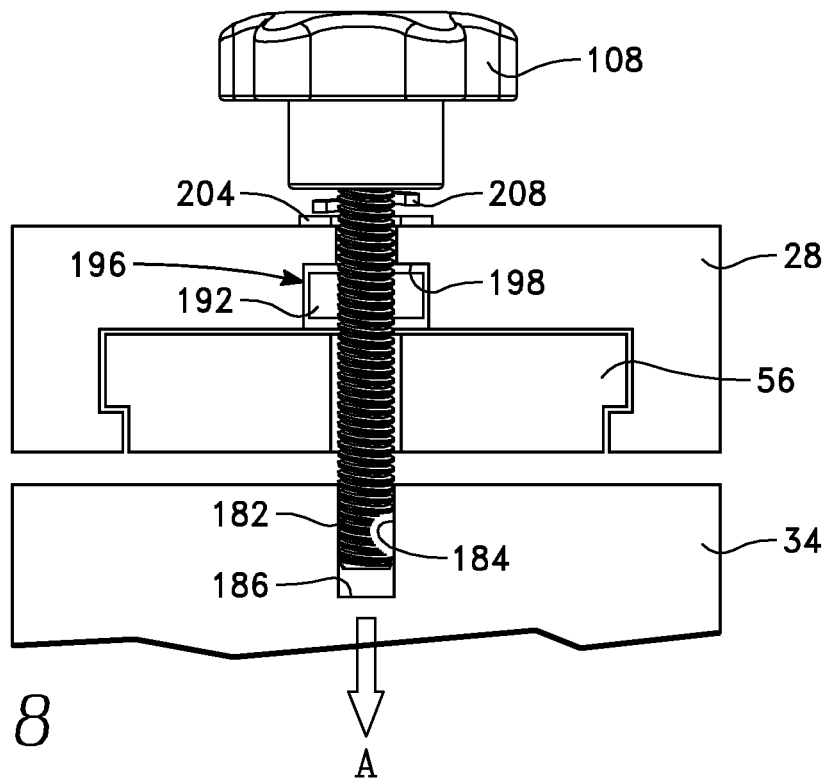
FIG. 8 is a schematic representation, similar to FIG. 7, of the carriage locking mechanism with the slide plate clamped against the angled base member and the carriage position moved forward in accordance with the present invention.

With reference to FIG. 8, upon further rotation of the clamping shaft within the threaded carriage aperture, the threaded clamping shaft 182 moves forward within the clamping nut 192, resulting the forward movement of the carriage 34 (in the direction of Arrow A), separating the carriage 34 from the slide plate 56 (as permitted by the shoulder screw-compression spring connection between the two). This forward movement of the carriage 34 places additional pressure against the workpiece, securing its position within the jig during drilling.

Movement of the carriage 34 along the angled base 28 permits variance in the distance between the drill guide surface of the carriage 34 and the inner surface of the vertical member 18, and thus accommodation to workpieces 92 of different thickness. FIGS. 9-11 show such adjustability, while maintaining drill positioning relative to the workpiece at the desired angle and depth. The user never need change the depth stop setting of the drill bit collar for materials within the width-range provided. Providing the correct screw clearance for all drilled pocket hole joints, regardless of workpiece thickness, assures the tightest possible joints.

Figure 13:
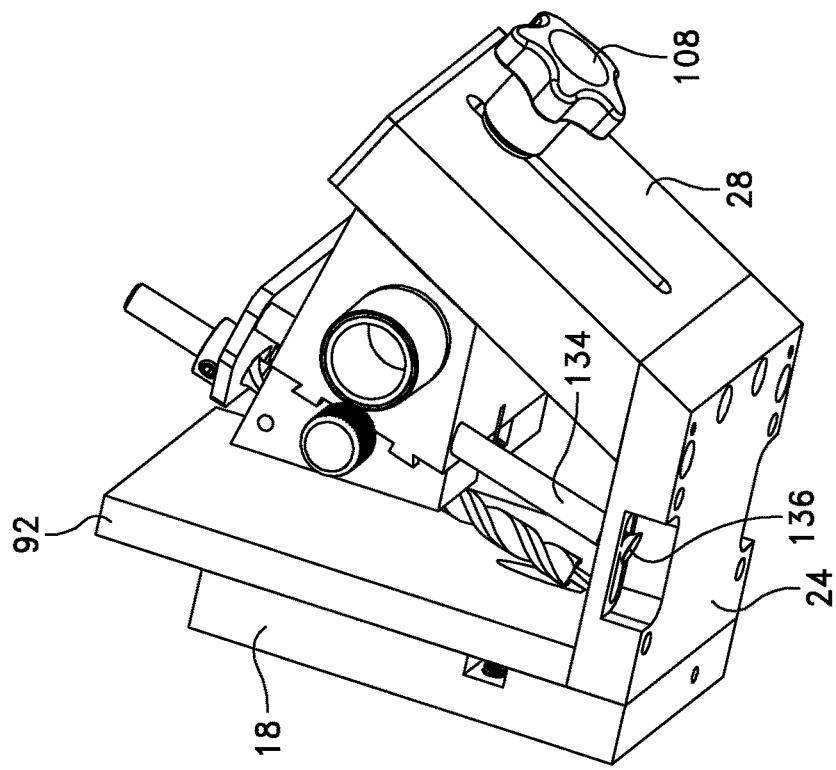
FIG. 13 is a rear bottom perspective view of a self-adjusting pocket hole jig in accordance with the present invention.
Figure 12:
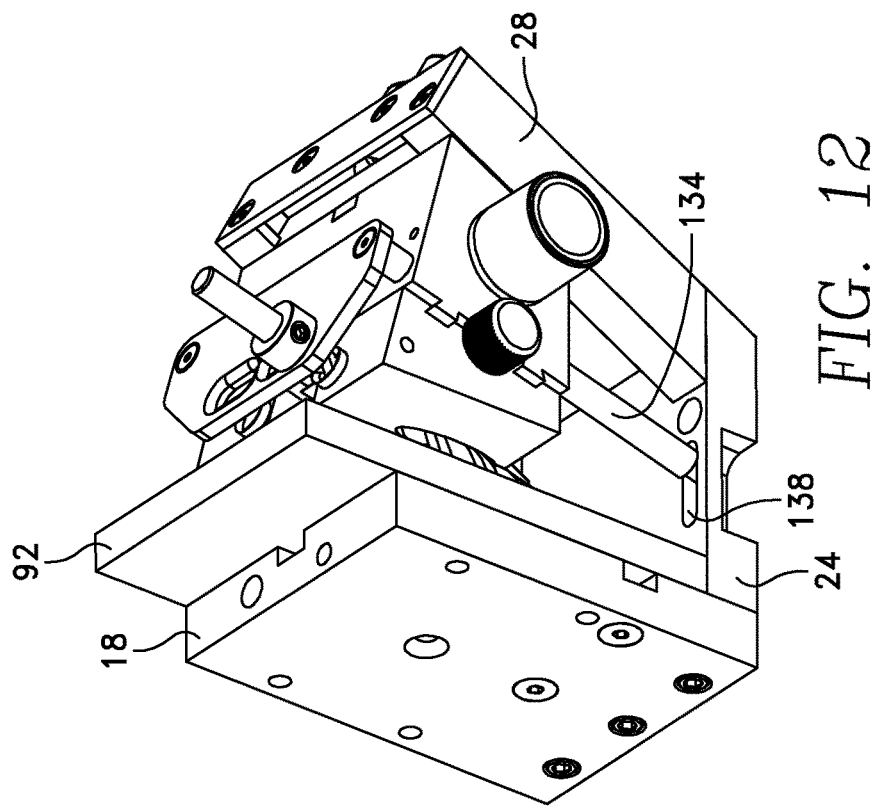
FIG. 12 is a front elevated perspective view of a self-adjusting pocket hole jig in accordance with the present invention.

A pair of guide rods 134 (see FIGS. 12 and 13), control horizontal movement of the depth stop plate 116. Vertical movement of the guide rods 134 in the upward direction is restricted by the angled undersides of the flat head bottom cap screws 136, and in the downward direction by the reduced diameter of the guide rods 134 at their lower ends, fitting in the bottom support grooves 138.

Figure 14:
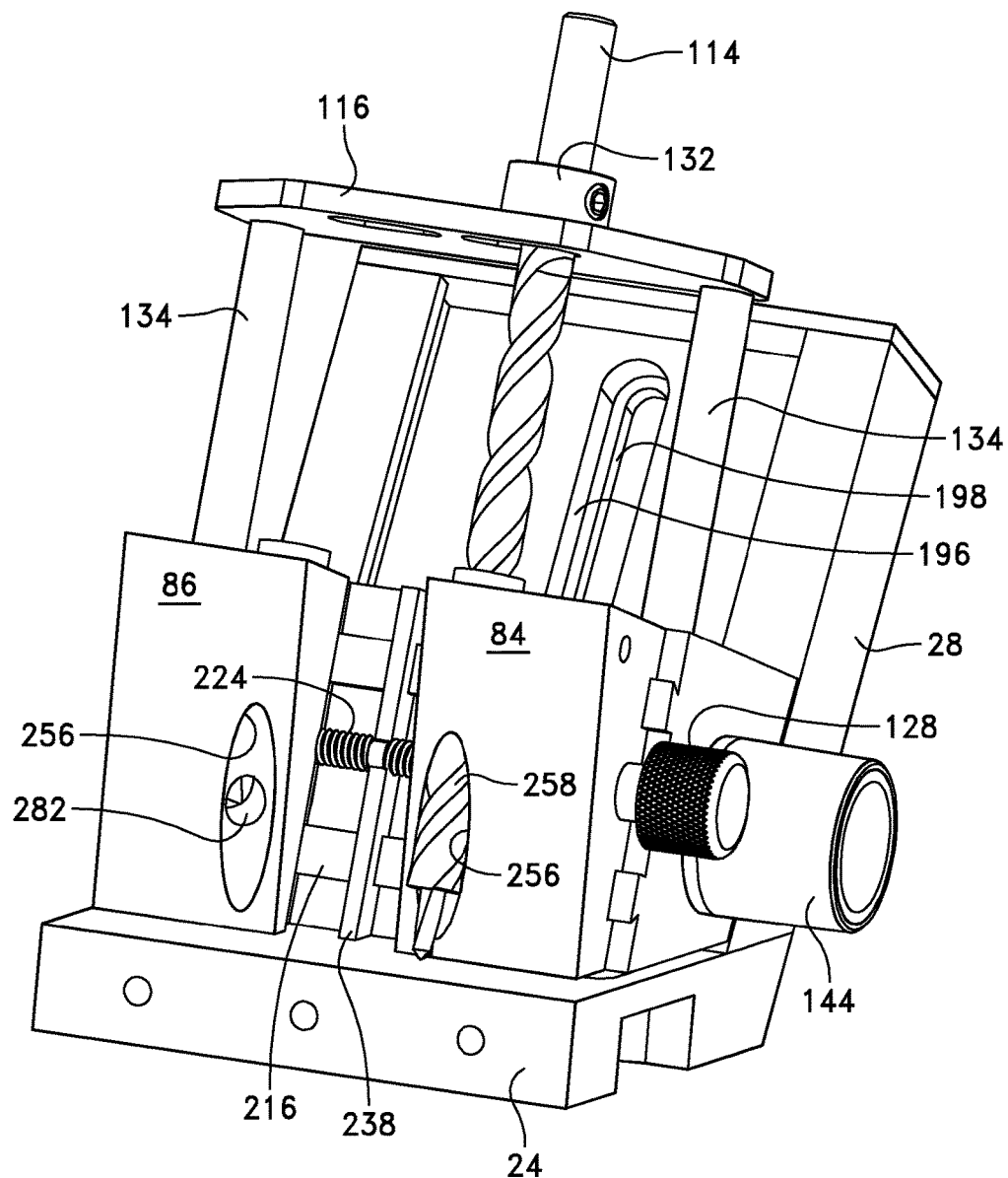
FIG. 14 is a front perspective view of a self-adjusting pocket hole jig, with the vertical base removed, in accordance with the present invention.

In FIG. 14 the pair of adjustable drill guides 84, 86 are attached to the carriage 34 using a dovetail rail and groove connection. A pair of dovetail rails 216 are formed in a front surface of the carriage 34. A pair of dovetail grooves 218 of corresponding dimensions are formed in a rear surface of each of the pair of adjustable drill guides 84, 86. The pair of adjustable drill guides 84, 86 are slidably received upon the protruding pair of dovetail rails 216. Such manner of mounting the pair of drill guides 84, 86 to the carriage 34 enables the high-precision lateral placement of the drill guides 84, 86 when establishing the location of the pocket holes.

Figure 17:
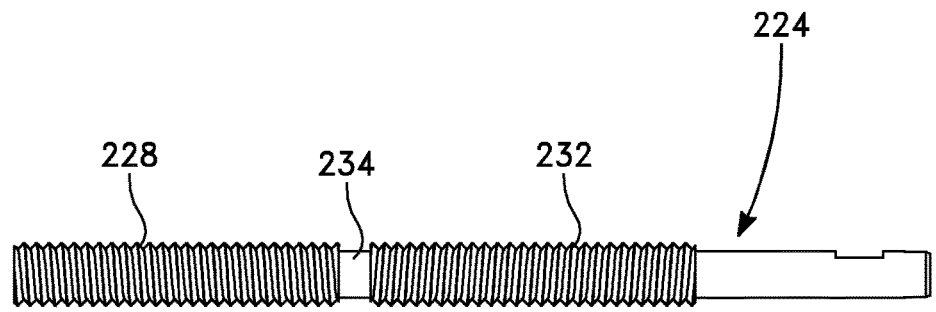
FIG. 17 is a side elevation view of a spacing control shaft in accordance with the present invention.
Figure 20:
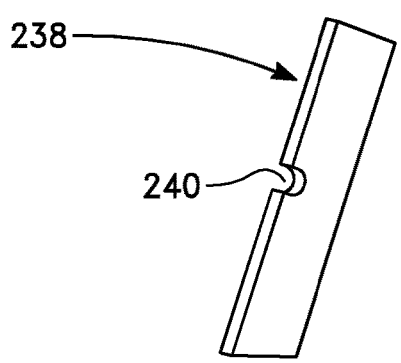
FIG. 20 is a perspective view of a center divider in accordance with the present invention.

The spacing between the pair of drill guides 84, 86 is user adjustable, using a threaded spacing control shaft 224 that extends through both of the drill guides 84, 86. As shown in FIG. 17, the spacing control shaft 224 has a length of right hand thread 228 and a length of left hand thread 232 separated by a center groove 234. As is shown in FIG. 14 a center divider 238 projects from the front surface of the carriage 34 and a control shaft support opening 240 formed mid-ways along the front face (see FIG. 20), receives the center groove 234, providing a bearing surface to support the spacing control shaft 224.

For purposes of identification only, a left/right orientation is placed upon the pair of drill guides 84, 86, as viewed from the workpiece towards the carriage—a right drill guide 84 and a left drill guide 86. The spacing control shaft 224 is received within a control shaft opening 242 formed in each of the adjustable drill guides, with left-hand internal threads in the right drill guide control shaft opening 242a and with right-hand internal threads in the left drill guide control shaft opening 242b. The spacing control knob 128 attaches to one end of the spacing control shaft 224, and by rotation of the spacing control knob 128 in one direction brings the guides closer together, and turning in the other direction moves the guides further apart.

Figure 15:
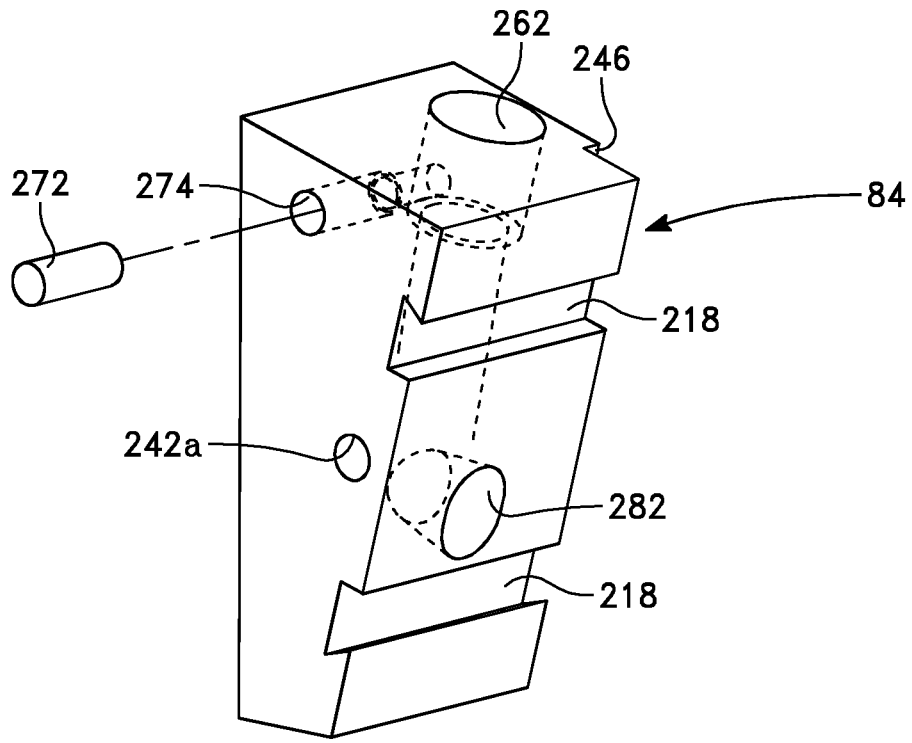
FIG. 15 is a front perspective view, with portions shown in phantom and portions shown exploded, of a right adjustable drill guide in accordance with the present invention.
Figure 16:
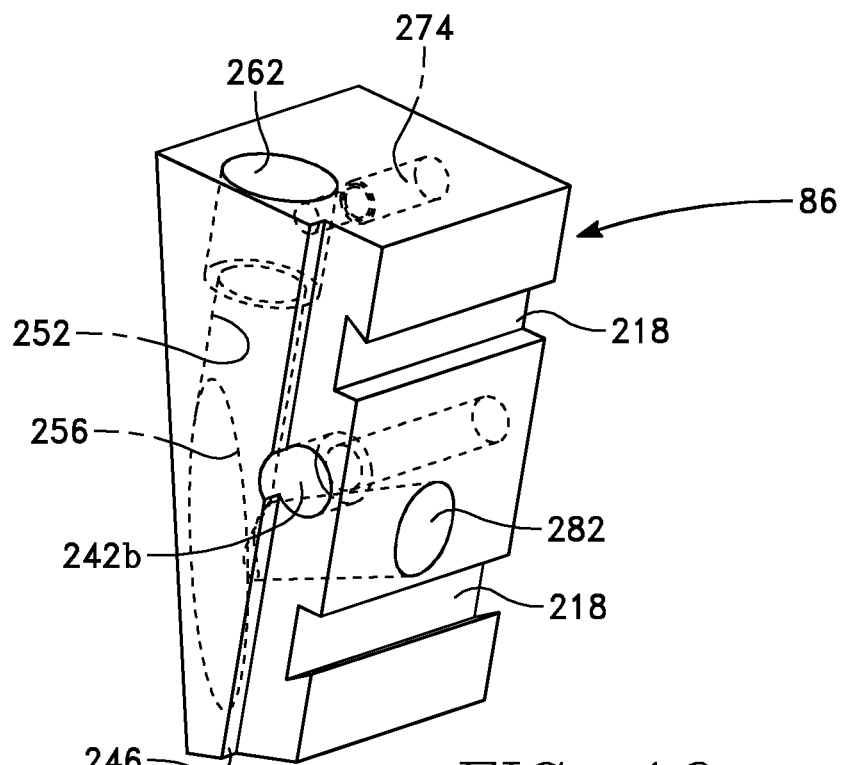
FIG. 16 is a front perspective view, similar to FIG. 15, with portions shown in phantom, of a left adjustable drill guide in accordance with the present invention.
Figure 18:
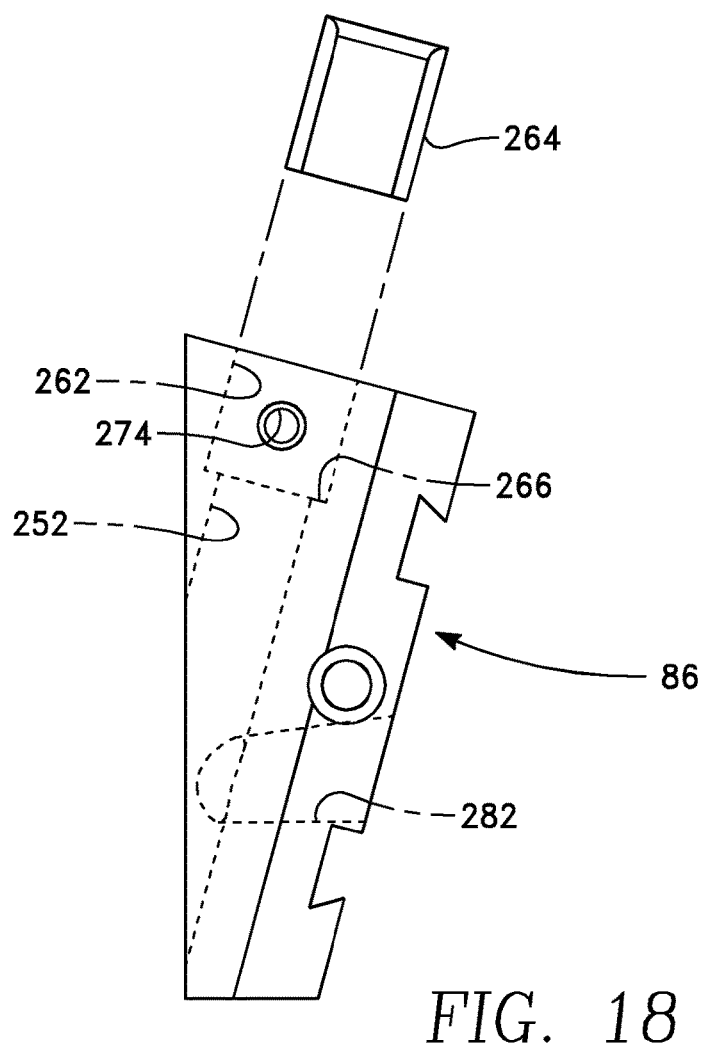
FIG. 18 is a side elevation view, with portions shown in phantom and portions shown exploded, of a right adjustable drill guide in accordance with the present invention.

FIGS. 15, 16, and 18 show several views of the adjustable drill guides 84, 86. Each of the pair of adjustable drill guides 84, 86 ride on the spacing control shaft 224, which is supported by the center divider 238. A center divider recess 246 is formed along the inner edges of both drill guides 84, 86 each receiving a portion of the projecting center divider 238 when the drill guides 84, 86 are positioned to adjoin the center divider 238.

A drill guide bore 252 extends downward through each of the pair of drill guides 84, 86, with an elongate drill opening 256 formed in the front face of each of the drill guides 84, 86 to accommodate emergence of an angled drill bit 258 during formation of the pocket hole (see FIGS. 14, 16, and 18). An enlarged bore 262 is formed in the upper portion of the drill guide bore 252 to receive a bushing 264 that protects the upper section of the drill guide bore 252 from such wear and impact damage as might otherwise occur during use of the step drill 114. The bushing 264 rests upon an internal seat 266 formed at the base of the enlarged bore 262, and a pair of setscrews 272, received within a setscrew aperture 274 formed in the upper section of each of the drill guides 84, 86, holds the bushing 264 in place within the enlarged bore 262.

A network of ducts formed within each of the pair of adjustable drill guides 84, 86 routes the wood chips and dust generated by the drilling away from the step drill 114. Initially, a tapered dust channel 282 formed in both drill guides 84, 86 opens from the drill guide bore 252 at a location adjacent to the elongate drill opening 256. The tapered dust channel 282 provides a broadening taper to minimize clogging as the chips and dust move away from the elongate drill opening 256 and the angled drill bit 258.

Figure 19:
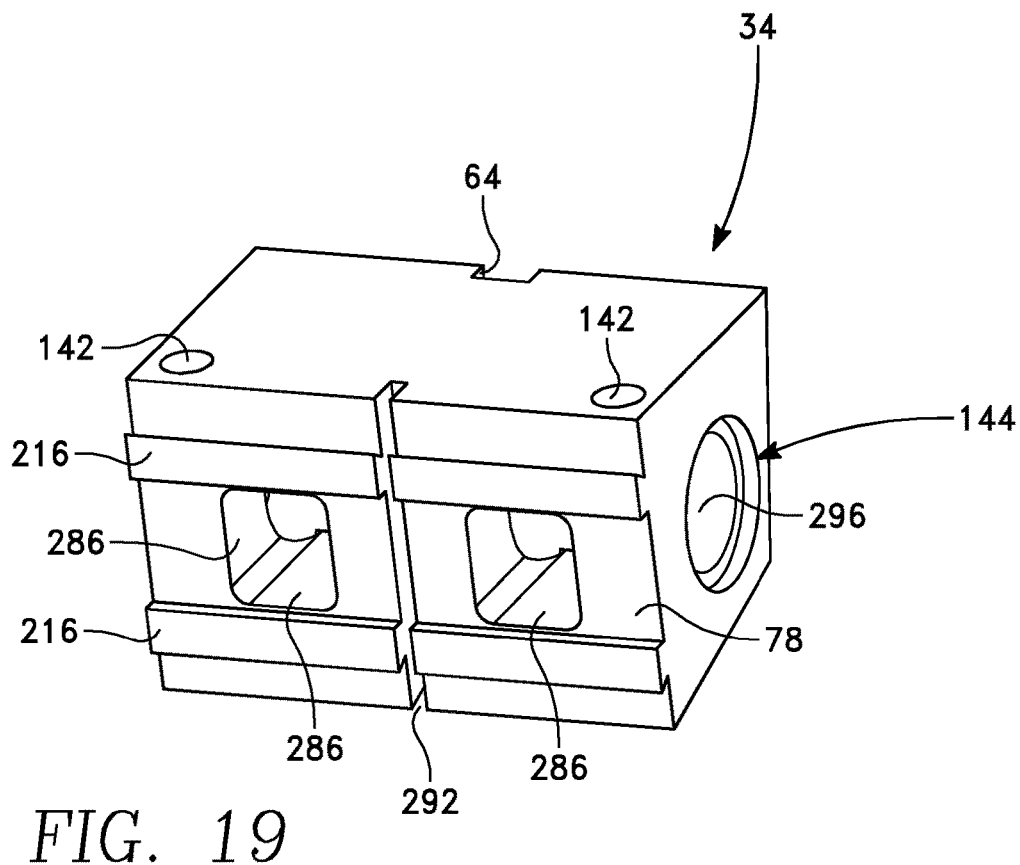
FIG. 19 is an elevated front perspective view of a carriage in accordance with the present invention.
Figure 21:
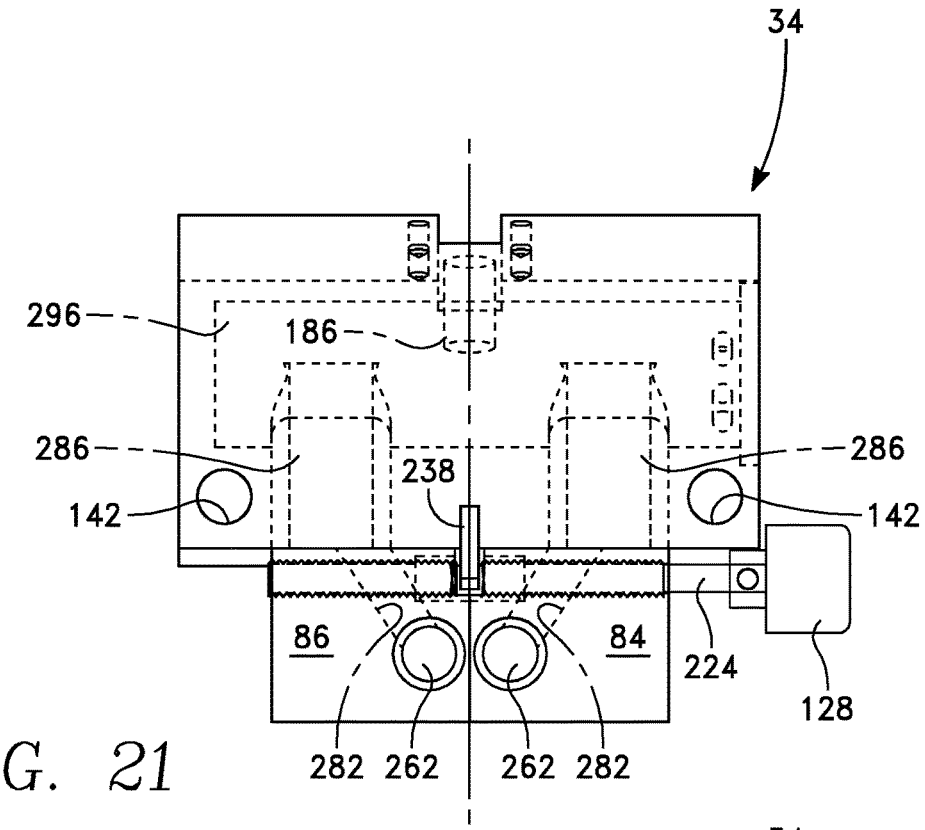
FIG. 21 is a top plan view, with portions shown in phantom, of a carriage and attached adjustable drill guides, the drill guides positioned adjacent to one another, in accordance with the present invention.
Figure 22:
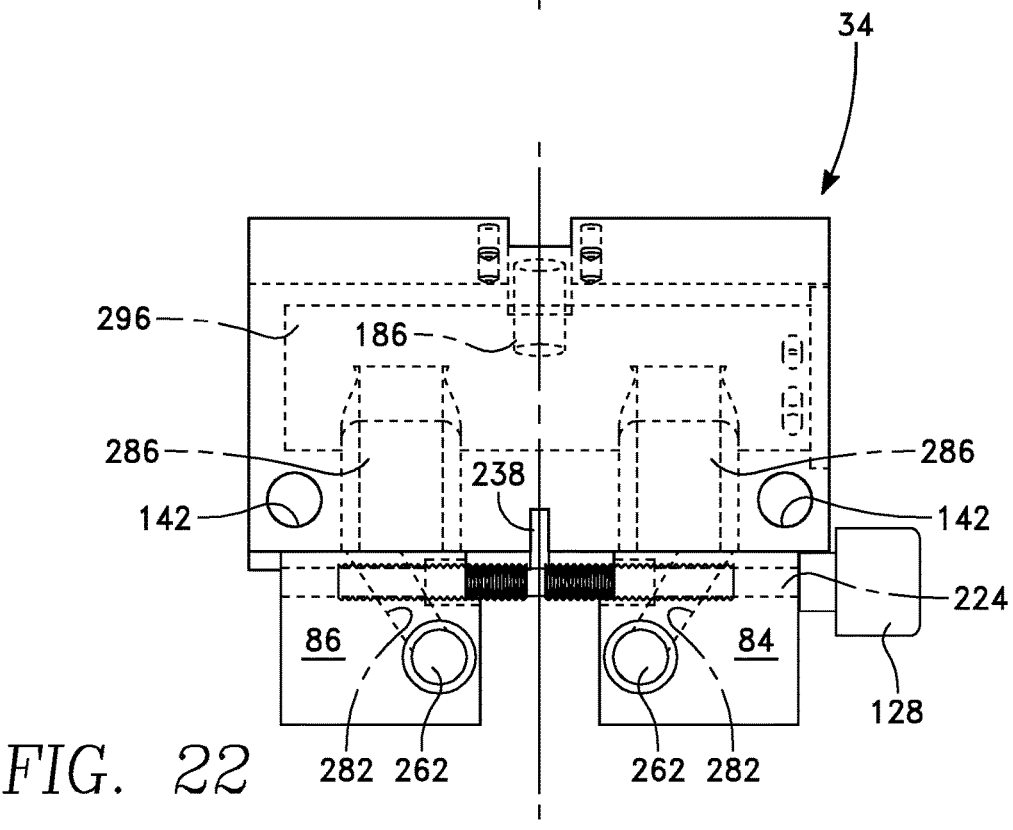
FIG. 22 is a top plan view, similar to FIG. 21, with portions shown in phantom, of a carriage and attached adjustable drill guides, the drill guides positioned apart from one another, in accordance with the present invention.

The wood debris from the drilling guides 84, 86 is received by a pair of dust evacuation channels 286 formed in the carriage 34 (see FIGS. 19, 21, and 22). Each of the pair of evacuation channels 286 align with a separate one of the tapered dust channels 282 of the pair of drilling guides 84, 86. A center divider slot 292 formed in the carriage 34 receives the center divider 238, which assists in maintaining proper alignment of the drilling guides 84, 86. The dust evacuation channels 286 convey wooden debris received from the tapered dust channels 282 into a debris chamber 296 that is formed inside of the carriage 34 and laterally extends across the rear portions thereof.

The shop vac connection 144 formed in one side of the carriage 34 enables the easy evacuation of accumulating chips and dust during drill operation. The large debris chamber 296 within the carriage 34 enables drill operation even without a shop vac, the accumulated chips and dust manually removed by the operator as needed during multiple drilling operations.

Figure 23:
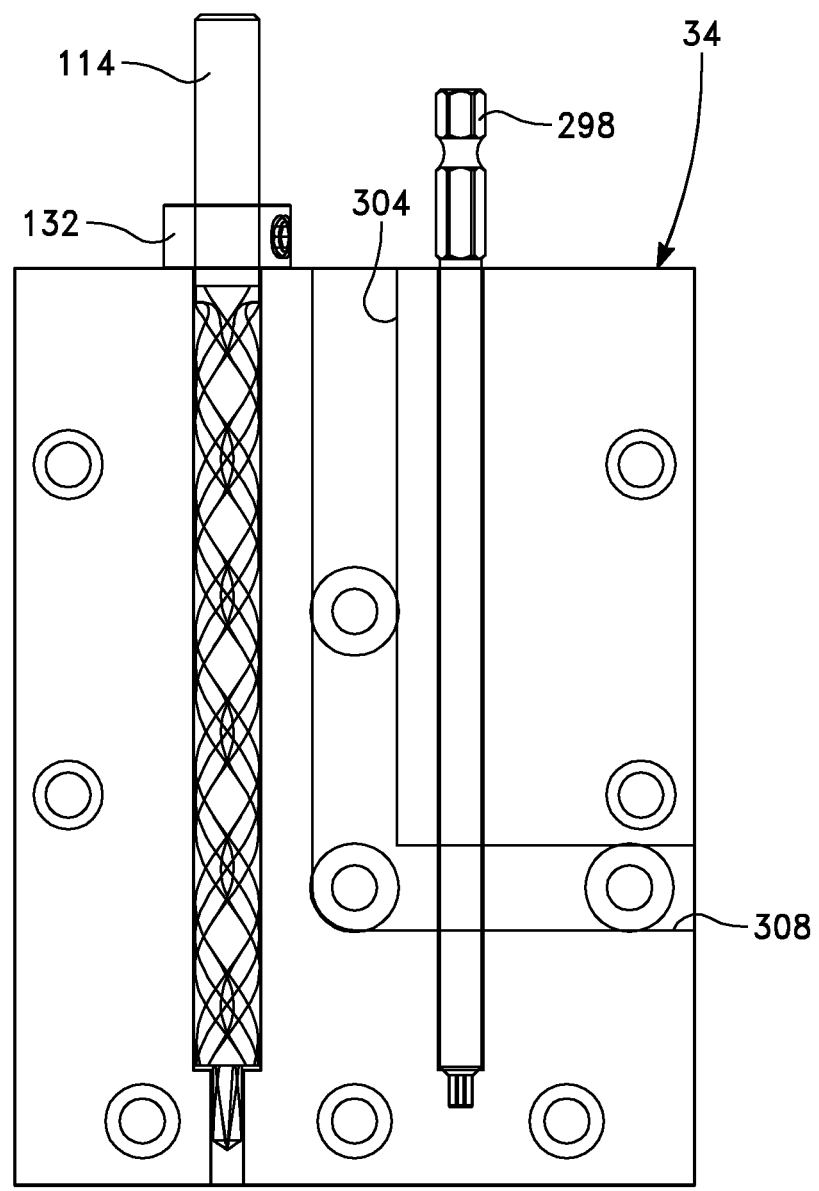
FIG. 23 is a side elevation view, in cross-section, of storage cavities formed in a vertical base member, and articles stored therein, in accordance with the present invention.
Figure 27:
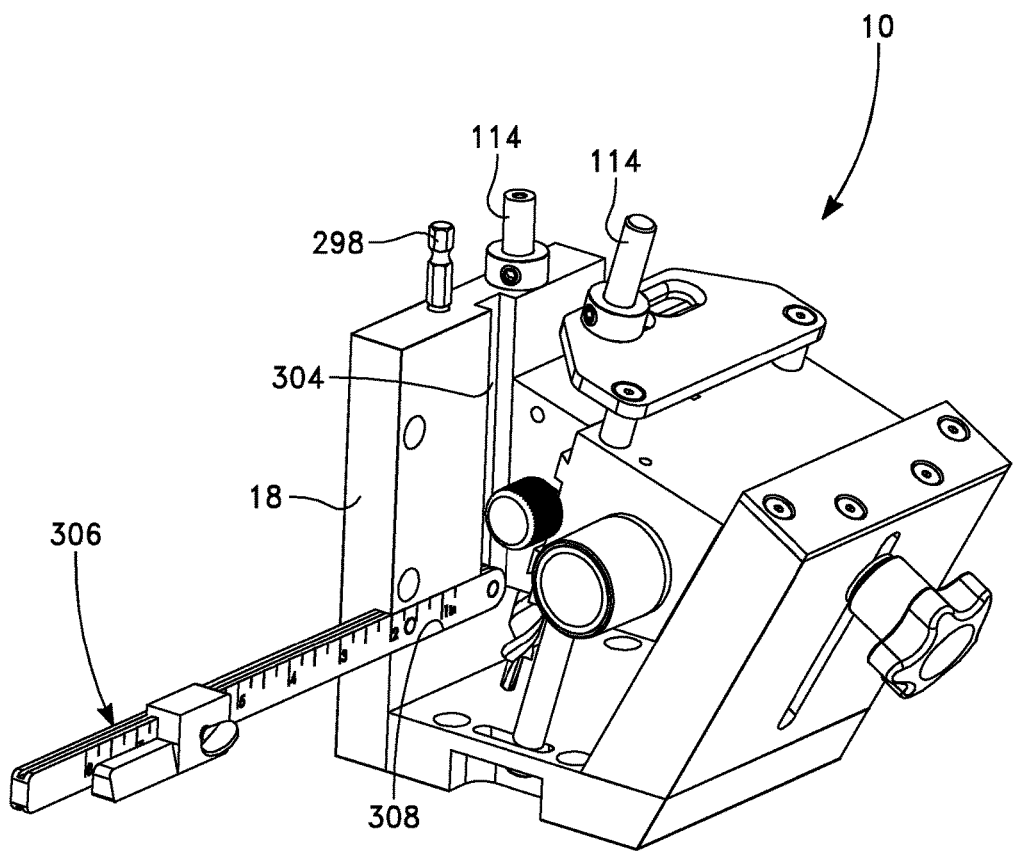
FIG. 27 is an elevated side perspective view of a pocket hole jig with a side stop in accordance with the present invention.
Figure 28:
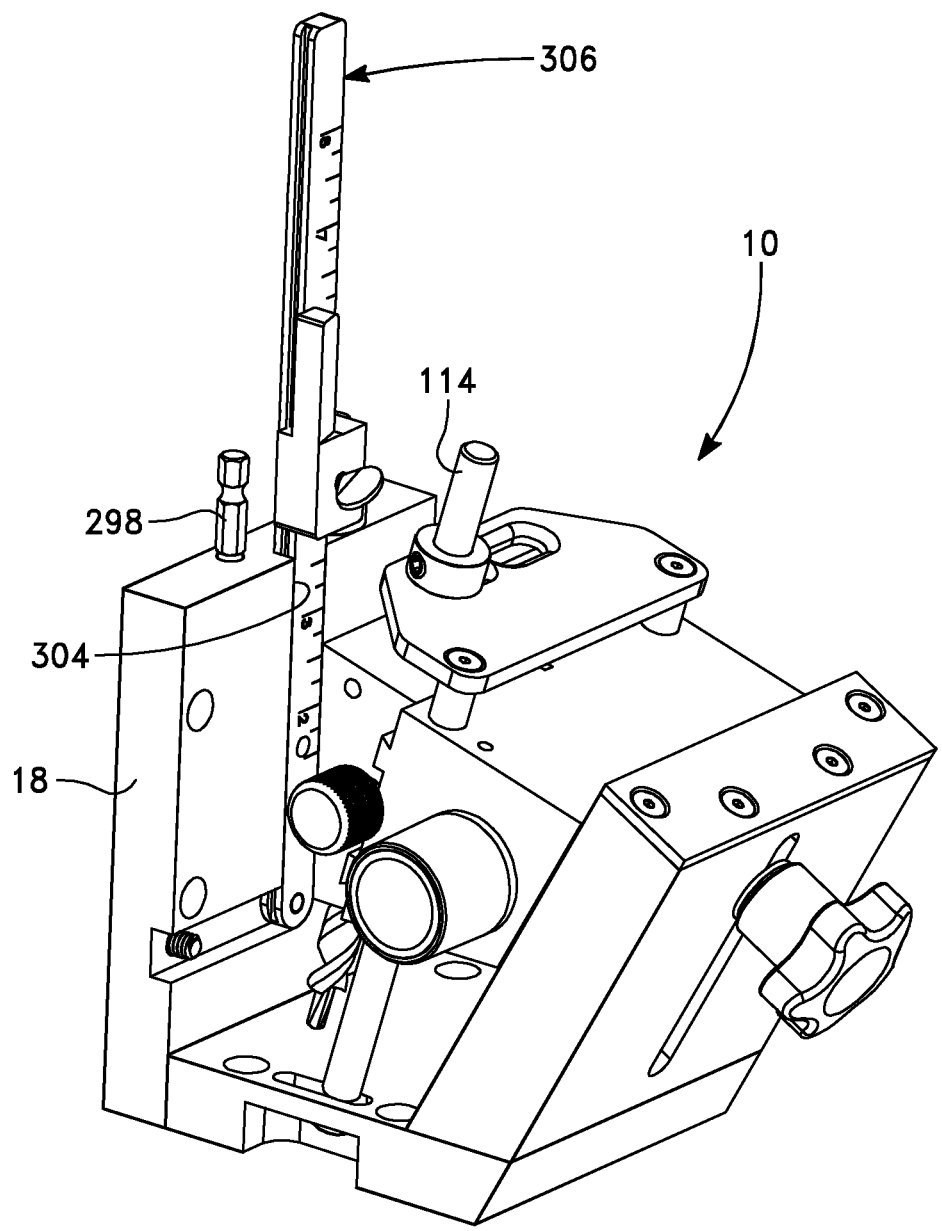
FIG. 28 is an elevated side perspective view, similar to FIG. 27, of a pocket hole jig with a side stop stored within the vertical base member in accordance with the present invention.

In a presently preferred embodiment shown in FIG. 23 the vertical base 18 includes cavities formed therein for storage of the step 114 drill and a driver 298. The storage cavity for the step drill supports the drill bit at the cavity bottom, permitting adjustment of shaft collar 132 location along the shaft without concern for drill shaft movement during such adjustment. Also shown in FIG. 23 is a cavity 304 for storage of a side stop assembly 306 (see FIGS. 27 and 28) and the square driver 298. During use, the side stop assembly 306 is received within a side stop slot 308 formed in a lower edge of the vertical base member.

Figure 29:
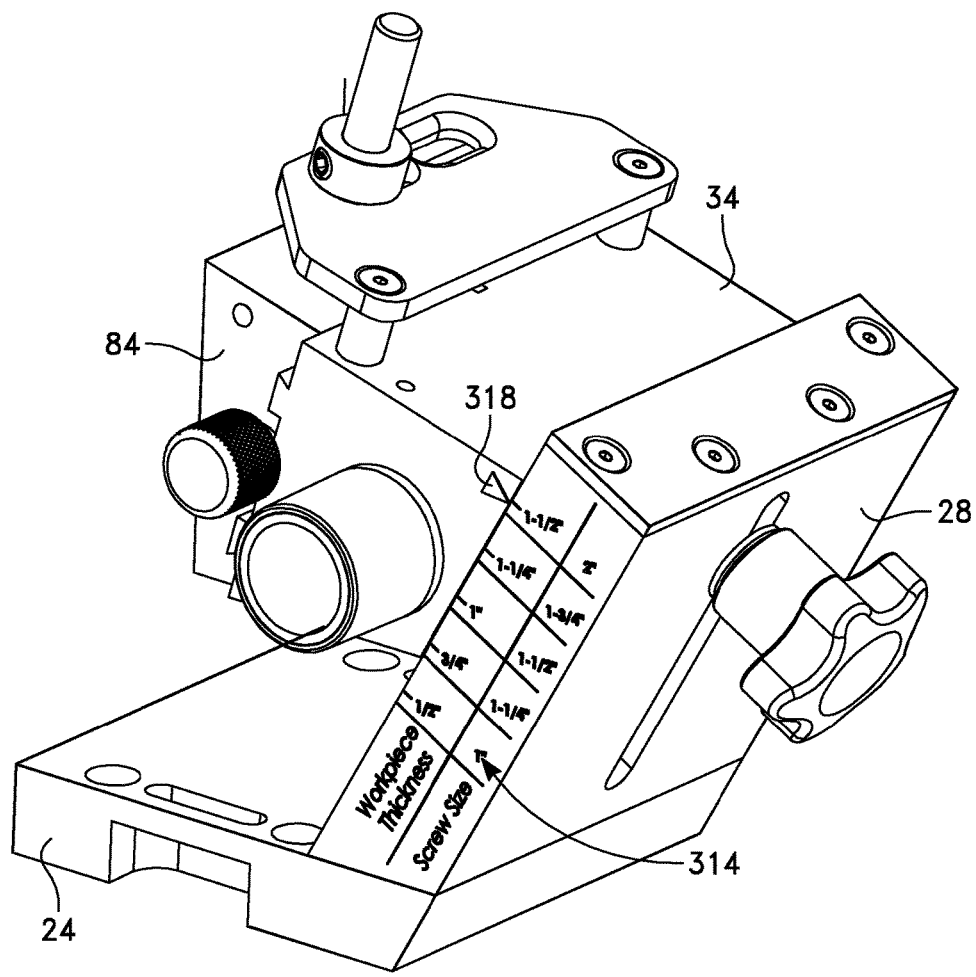
FIG. 29 is a partial elevated side perspective view shown a manner of operation of a carriage positional indicator and a lookup table positioned on an angled base member in accordance with the present invention.

FIG. 29 illustrates the cooperative use of a lookup table 314 displayed on a side surface of the angled base member 28 with a carriage positional indicator 318 (shown as an arrow in FIG. 29) inscribed on the side surface of the carriage 34 along the rear edge at a location that is adjacent to the side surface of the angled base member 28.

Upon moving the carriage 34 along the front surface of the angled base 44 until the front surfaces 102, 104 of the pair of adjustable drill guides 84, 86 make contact with the workpiece 92 (not shown in FIG. 29), the carriage positional indicator 318 will be positioned adjacent a table entry in the lookup table 314 identifying the workpiece thickness. Associated with such entry in the lookup table 314 is a recommendation of appropriate screw size (length) to use when making the pocket hole joint. In FIG. 29 the carriage positional indicator 318 identifies the workpiece thickness as 1½ inches and recommends use of a screw length of 2 inches.

To further assist in the understanding of the nature and features of the present self-adjusting pocket hole jig invention, the following narrative and drawings provide an example of its use. A wooden workpiece is received within the pocket hole jig of FIG. 1, the workpiece is placed against the vertical base member and rests upon the horizontal base member. Where multiple pieces must be drilled alike, a side stop assembly is provided within the vertical base, enabling a user to easily place multiple workpieces at the same, fixed lateral position on the jig relative to the vertical base and to the drilling guides. For larger workpieces, a side stop is available.

The carriage is initially located at an upper position on the angled base. Rotation of the clamping knob loosens the clamp connection of the carriage and angled base, permitting movement of the carriage down the angled base until making contact with the front surface of the workpiece (see FIG. 1). The clamping knob is rotated in a clockwise manner to secure the carriage/slide plate tightly in place against the angled base. Continued turning of the clamping knob moves the carriage forward, separating it from the slide plate and pressing it tightly against the workpiece.

The majority of pocket hole joints use two pocket holes and screws to assure a secure and square joint. Spacing between the two screws varies depending upon workpiece width (closer for narrow workpieces, further apart if wider). Adjustment is made to the left/right guide hole spacing using the spacing control knob to operate the spacing control shaft. Such spacing is symmetric to the jig centerline, and is easily adjusted and changed to fit the workpiece width.

Once adjusted, the step drill is mounted in a power drill and inserted through one of the elongated slots of the drill depth stop platform and then into the lower drill bushing until the drill tip rests on the angled side of the workpiece. The drill motor is activated, and drilling of the workpieces proceeds until the drill shaft collar contacts the drill stop platform. While still under power, the step drill is removed from the jig.

Normal drilling techniques are used during this process, including the raising of the drill bit every so often to permit any accumulated sawdust to clear from the pocket hole prior to reaching the hole bottom. The woodchips and dust generated by the drilling are conveyed through the dust channel formed in the drill guides, into and through the dust evacuation channels of the carriage, where it accumulates within the debris chamber until removal.

Upon completion of the two pocket holes the drill and step drill are removed from the drilling guide, the clamping knob rotated counterclockwise to first relieve the carriage pressure against the workpiece, and then permit movement of the carriage upwards and away from the workpiece along the angle base.

Figure 26:
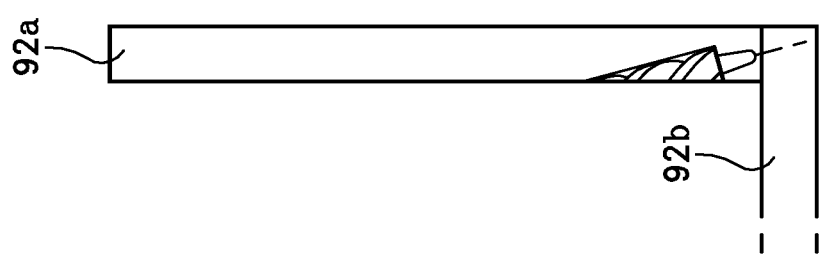
FIG. 26 is a schematic representation in side elevation, similar to FIGS. 24 and 25, of two workpieces of narrow thickness having a pocket hole formed prior to their being joined in accordance with the present invention.
Figure 25:
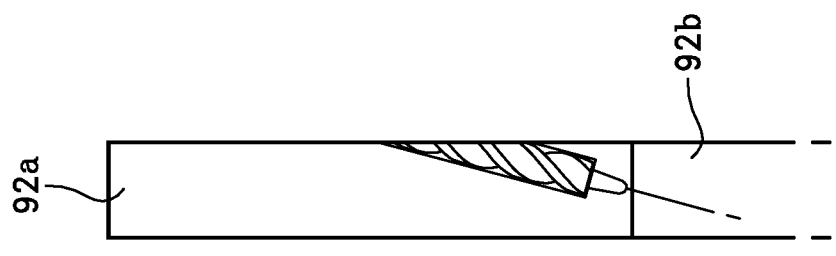
FIG. 25 is a schematic representation in side elevation, similar to FIG. 24, of two workpieces of medium thickness having a pocket hole formed prior to their being joined in accordance with the present invention.
Figure 24:
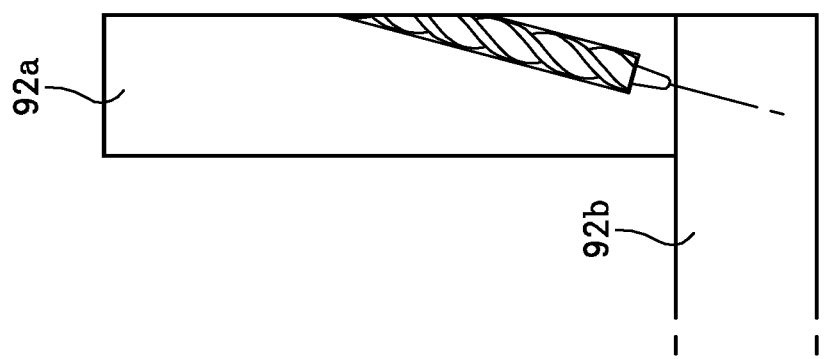
FIG. 24 is a schematic representation in side elevation of two thick workpieces having a pocket hole formed prior to their being joined in accordance with the present invention.

Removal of the workpiece follows, and the first workpiece 92a (with the pocket holes) is clamped to the second workpiece 92b, as is shown using three examples in FIGS. 24-26. Pocket hole screws are placed at the bottom of the pocket holes, and a power drill and driver advance the screw through the remaining wood of the first workpiece and drive the screw into the second workpiece, forming the joint.

FIGS. 24-26 provide three examples of such joinery. In FIG. 24 two 1½-inch workpieces are joined by two pocket holes (only one is shown), using two 2-inch long pocket hole screws. The screws extend 0.580 inch in the first workpiece and 1.40 inches into the second. In FIG. 26 two ½-inch workpieces are joined, using 1-inch long pocket hole screws, extending 0.580 inch in the first workpiece and 0.420 inch in the second. In FIG. 25 a 1-inch workpiece is joined to a 1-inch workpiece, using 1½-inch long pocket hole screws, extending ½-inch in the first workpiece and 1 inch in the second.

In a presently preferred example, and by way of example and not limitation, the following components are suitable for providing a self-adjusting pocket hole jig in accordance with the present invention. The jig base may be the 3-piece unit fabricated out of machined aluminum discussed above or the jig base may be implemented as a one or two-piece construction using machined, molded, or cast aluminum or other materials. Such alternative materials include, but are not limited to, cast zinc or non-deforming plastics, such as ABS (acrylonitrile butadiene styrene) plastic.

A suitably sized jig has a vertical base measuring 5.4 inches in length, 4 inches in width, and ¾-inch in thickness, a horizontal base measuring 4.16 inches in length, 4 inches in width, and ¾-inch in thickness, and an angle base measuring 4.62 inches in length, 4 inches in width, and 1⅛ inches in thickness. A slide channel in the angled base having measurements of 3 inches major width and approximately 2.75 inches minor width, over the angle base length of 4.62 inches is formed to receive a slide plate measuring 2.3 inches in length, 3 inches in width, and 0.67 inch in thickness.

A vertical slot formed in the rear surface of the angle base extends approximately 3¾ inches in length and is ½-inch width, receiving a threaded clamping shaft of 5/16 inches in diameter and 2 inches in length. A 5/16-18 hex nut (the only internally threaded component used in the assembly) with a dimension across the flats of ½-inch is loosely received by the clamping shaft. A closed end bore or aperture formed partway into the carriage has a depth of approximately 0.48 inches and a diameter just slightly larger than the 5/16 inch outside diameter of the clamping shaft.

A clamping adjustment knob attaches to an outer end of the clamping shaft; however, a cam-operated lever could also be used. In either case, a double-action securement occurs; first securing the slide plate from movement, and then the forward press of the carriage against the workpiece securely clamps the workpiece (see FIGS. 4-8).

The carriage has four sides, none of them parallel. A base measures 1.905 inches, a rear surface 1.981 inches, a top surface 2.292 inches, with a width of 4 inches and a height at the front of 2.339 inches. The dust evacuation channels each consist of a cavity having a volume of approximately 0.04535 cubic inches, measuring approximately 0.27 inch in diameter at one end and approximately 0.316 inch in diameter at the other end, and a length of approximately 0.67 of an inch. The debris chamber approximates a cylinder having a 1-inch diameter and a length of 3⅞ inches, providing a volume of approximately 3.04 cubic inches.

The dovetail slides formed on the front face of the carriage measure 0.125 inch by 0.345 inch. As can be appreciated, other, similar slide technology may be used, such as square carriage slides, instead of dovetail slides, without departing from the scope and content of the present invention.

A pair of guide rods, each having a diameter of 0.375 inch and an approximate total length of 5.18 inches, guide the angled horizontal movement of the depth stop plate, with each of the guide rods received in a separate guide rod aperture formed in corresponding forward locations in the carriage. The guide rods are slidably attached to the horizontal base using flat head cap screws and a reduced lower rod end diameter.

Dust relief is provided at the underside of the horizontal base to facilitate removal of any buildup of sawdust that may occur. The rod end groove is a reduced diameter to seat the end of the guide rod to prevent movement in the downward direction. The upper end of each guide rod is received by the depth stop plate and fixedly attached by flat head screws. This manner of constraint enables the necessary range of motion of the guide rods, slightly more than one inch in the horizontal direction, while limited to a slip fit in the vertical direction.

In general measurement, the drilling guides have a height of 2.648 inches, a width of 1.365 inches, a depth at its base of 0.527 inches, and 1.194 inches at the top surface. The drill bushing has a 0.377 inch inside diameter, an outside diameter of 0.50 inch, and a length of 0.50 inch, and is received within an enlarged bore at the upper end of the drill guide bore.

Use of a hardened steel bushing enables fabrication of the remainder of the drilling guide out of a softer, plastic material, such as DELRIN® brand acetal resin or ABS plastic, with the possible exception of a hardened steel threaded liner for the spacing control shaft opening, which measures 0.250 inch in diameter and extends through each drilling guide. The spacing control shaft measures 0.25 inch in diameter and is approximately 4 inches in length.

The pocket hole angle provided by the present jig is 15 degrees. Although 15 degrees is considered somewhat of a standard angle for pocket holes, other angles can be obtained upon changing the carriage slide angle. In this regard, it has been determined that the ratio of the tangent of the carriage slide angle to the tangent of the drill angle must be an exact 2:1 ratio. For example, selection of 15 degrees for the drill angle requires the carriage slide angle to be the inverse tangent of twice the tangent of the drill angle—or 28.18 degrees.

My invention has been disclosed in terms of a preferred embodiment thereof, which provides a self-adjusting pocket hole jig that is of great novelty and utility. Various changes, modifications, and alterations in the teachings of the present invention may be contemplated by those skilled in the art without departing from the intended spirit and scope thereof. It is intended that the present invention encompass such changes and modifications.

What is claimed is:

1. A self-adjusting pocket hole jig comprising:
   a jig base comprising:
      a vertical base member,
      a horizontal base member attached to said vertical base member, and
      an angled base member attached to said horizontal member, and wherein in its assembled operable condition there is no movement among the individual base members of said jig base;
   a carriage slidably mounted to said angled base member and in its assembled operable condition adapted for movement toward and away from said vertical base member of said jig base;
   a pair of adjustable drill guides, each slidably mounted to a front surface of said carriage in a side-to-side reciprocating manner and in its assembled operable condition adapted for movement toward and away from one another, and wherein each of said adjustable drill guides has a drill guide bore formed therein, said drill guide bore extending from an upper surface to a front surface thereof; and
   a depth stop plate attached to said jig base and extending over each of said adjustable drill guides in a vertically superposed manner, wherein said depth stop plate has a pair of apertures formed therein, each of said pair of apertures located over a separate one of said pair of adjustable drill guides and each vertically co-located over a separate one of the drill guide bores, and wherein said depth stop plate is attached to said jig base in a manner such that movement of said depth stop plate in the vertical direction is restricted to a slip fit.

2. The self-adjusting pocket hole jig according to claim 1, wherein said pair of adjustable drill guides reciprocate toward and away from one another in a manner that is symmetric to a centerline of the self-adjusting pocket hole jig.

3. The self-adjusting pocket hole jig according to claim 2, wherein said pair of apertures in said depth stop plate are laterally elongated, enabling collinearity with respective ones of said drill guide bores formed in each of said pair of adjustable drill guides over a range of side-to-side reciprocating movement thereof.

4. The self-adjusting pocket hole jig according to claim 3, wherein each of said pair of adjustable drill guides has a horizontally extending control shaft opening formed therein, the pair of control shaft openings collinear with respect to one another when said pair of adjustable drill guides are slidably mounted to said carriage, and further comprising a spacing control shaft extending within and rotatably engaging with and received by each of said pair of control shaft openings, and in its assembled operable condition rotation of said spacing control shaft results in movement of said pair of drill guides toward and away from one another.

5. The self-adjusting pocket hole jig according to claim 4, wherein a length of a threaded surface is formed at each end of said spacing control shaft and wherein mating threaded surfaces to each of said lengths of threaded surface are formed within each of said pair of control shaft openings, and wherein engagement of said mating threaded surfaces by said spacing control shaft, and the subsequent rotation thereof, effects side-to-side movement of said pair of adjustable drill guides upon rotation of said spacing control shaft.

6. A self-adjusting pocket hole jig comprising:
  a jig base comprising:
    a vertical base member,
    a horizontal base member attached to said vertical base member, and
    an angled base member attached to said horizontal member, wherein said angled base member has a vertical slot formed therein, and wherein in its assembled operable condition there is no movement among the individual base members of said jig base;
  a carriage slidably mounted to said angled base member and in its assembled operable condition adapted for movement toward and away from said vertical base member of said jig base;
  a clamping mechanism attached to said carriage and in its assembled operable condition adapted for clamping engagement with said angled base member and subsequent forward movement of the front surface of said carriage toward said vertical base member;
  a clamping shaft engaging said clamping mechanism and extending outwardly therefrom, passing through said vertical slot;
  a clamping adjustment knob attached to an outer end of said clamping shaft;
  a pair of adjustable drill guides, each slidably mounted to a front surface of said carriage in a side-to-side reciprocating manner and in its assembled operable condition adapted for movement toward and away from one another, and wherein each of said adjustable drill guides has a drill guide bore formed therein, said drill guide bore extending from an upper surface to a front surface thereof; and
  a depth stop plate attached to said jig base and extending over each of said adjustable drill guides in a vertically superposed manner, wherein said depth stop plate has a pair of apertures formed therein, each of said pair of apertures located over a separate one of said pair of adjustable drill guides and each vertically co-located over a separate one of the drill guide bores, and wherein said depth stop plate is attached to said jig base in a manner such that movement of said depth stop plate in the vertical direction is restricted to a slip fit.

7. The self-adjusting pocket hole jig according to claim 6, wherein said angled base member has a slide channel formed therein and said carriage has a closed end aperture formed in a rear surface thereof, and wherein said clamping mechanism comprises:
  a slide plate slidably received within said slide channel of said angled base member and attached to the rear surface of said carriage in a biased manner enabling a selectively obtained spaced separation of said slide plate from the rear surface of said carriage, wherein said slide plate has a clamping shaft passage extending therethrough at a location collinear with the closed end aperture formed in said rear surface of said carriage, and
  a clamping nut received within the slide channel and positioned for threaded engagement with said clamping shaft upon insertion of said clamping shaft within said clamping shaft passage,
  whereby rotation of said clamping shaft draws said clamping nut into secure engagement with said slide channel, and further rotation of said clamping shaft presses an end of said clamping shaft against a rear surface of said closed end aperture in said carriage, separating said carriage from said slide plate in a biased manner.

8. A self-adjusting pocket hole jig comprising:
  a jig base comprising:
    a vertical base member;
    a horizontal base member attached to said vertical base member, and
    an angled base member attached to said horizontal member, and wherein in its assembled operable condition there is no movement among the individual base members of said jig base;
  a carriage slidably mounted to said angled base member and in its assembled operable condition adapted for movement toward and away from said vertical base member of said jig base;
  at least one drill guide mounted to a front surface of said carriage, wherein each said at least one drill guide has a bore formed therein extending from an upper surface to a front surface thereof; and
  a depth stop plate attached to said jig base and extending over each of said at least one drill guide in a vertically superposed manner, wherein said depth stop plate has at least one aperture formed therein, and wherein said depth stop plate is attached to said jig base in a manner such that movement of said depth stop plate in the vertical direction is restricted to a slip fit.

9. The self-adjusting pocket hole jig according to claim 8, wherein a pair of adjustable drill guides are slidably mounted to a front surface of said carriage in a side-to-side reciprocating manner and in its assembled operable condition adapted for movement toward and away from one another, and wherein each of said pair of adjustable drill guides has a drill guide bore formed therein, each said drill guide bore extending from an upper surface to a front surface thereof, and wherein said depth stop plate has a pair of apertures formed therein, each of said pair of apertures located over a separate one of said pair of adjustable drill guides and each vertically co-located over a separate one of the drill guide bores.

10. The self-adjusting pocket hole jig according to claim 9, wherein said pair of adjustable drill guides reciprocate toward and away from one another in a manner that is symmetric to a centerline of the self-adjusting pocket hole jig.

* * * * *